United States Patent
Beatty et al.

[11] Patent Number: 6,055,489
[45] Date of Patent: Apr. 25, 2000

[54] TEMPERATURE MEASUREMENT AND COMPENSATION SCHEME

[75] Inventors: Timothy S. Beatty, Mesa; Christopher P. McAllister, Chandler, both of Ariz.; Thomas D. Fletcher, Portland, Oreg.

[73] Assignee: Intel Corporation, Santa Clara, Calif.

[21] Appl. No.: 08/843,327

[22] Filed: Apr. 15, 1997

[51] Int. Cl.$^7$ .................................................. G01K 3/00
[52] U.S. Cl. ........................... 702/130; 702/99; 374/173; 374/182; 327/512
[58] Field of Search ............................... 702/99, 117, 130, 702/132; 374/178, 181, 182, 183, 101, 173; 327/67, 512

[56] References Cited

U.S. PATENT DOCUMENTS

| | | |
|---|---|---|
| H562 | 12/1988 | Trachier et al. . |
| Re. 32,960 | 6/1989 | Levine . |
| Re. 34,789 | 11/1994 | Fraden . |
| 4,432,031 | 2/1984 | Premerlani . |
| 4,442,972 | 4/1984 | Sahay et al. . |
| 4,488,824 | 12/1984 | Salem . |
| 4,591,855 | 5/1986 | Blackburn . |
| 4,751,405 | 6/1988 | Bufano, Jr. et al. . |
| 4,779,161 | 10/1988 | DeShazo, Jr. . |
| 4,787,007 | 11/1988 | Matsumura et al. . |
| 4,789,819 | 12/1988 | Nelson . |
| 4,799,176 | 1/1989 | Cacciatore . |
| 4,851,987 | 7/1989 | Day . |
| 4,903,106 | 2/1990 | Fukunaga et al. . |
| 4,924,112 | 5/1990 | Anderson et al. . |
| 4,935,864 | 6/1990 | Schmidt et al. . |
| 5,008,771 | 4/1991 | Palara . |
| 5,025,248 | 6/1991 | Bergeron . |
| 5,064,296 | 11/1991 | Huijsing et al. . |
| 5,077,491 | 12/1991 | Heck et al. . |
| 5,085,526 | 2/1992 | Sawtell et al. . |
| 5,087,870 | 2/1992 | Salesky et al. . |
| 5,105,366 | 4/1992 | Beckey . |
| 5,149,199 | 9/1992 | Kinoshita et al. ..................... 374/183 |
| 5,170,344 | 12/1992 | Berton et al. . |
| 5,253,938 | 10/1993 | Stixrud . |
| 5,255,149 | 10/1993 | Matsuo . |
| 5,283,631 | 2/1994 | Koerner et al. . |
| 5,287,292 | 2/1994 | Kenny et al. . |
| 5,291,607 | 3/1994 | Ristic et al. . |
| 5,319,370 | 6/1994 | Signore et al. ........................ 341/120 |
| 5,319,704 | 6/1994 | Robinson ............................... 379/389 |
| 5,325,286 | 6/1994 | Weng et al. . |
| 5,359,236 | 10/1994 | Giordano et al. . |
| 5,422,832 | 6/1995 | Moyal .................................... 702/132 |
| 5,440,305 | 8/1995 | Signore et al. ........................ 341/120 |
| 5,451,892 | 9/1995 | Bailey . |
| 5,453,682 | 9/1995 | Hinrichs et al. . |
| 5,560,017 | 9/1996 | Barrett et al. . |
| 5,838,578 | 11/1998 | Pippin . |
| 5,844,446 | 12/1998 | McAllister et al. . |

OTHER PUBLICATIONS

Allen, Philip E. and Douglas R. Holberg, *CMOS Analog Circuit Design*, published by Holt, Rinehart and Winston, Inc., 1987, pp. 539–548.

(List continued on next page.)

*Primary Examiner*—Marc S. Hoff
*Assistant Examiner*—Bryan Bui
*Attorney, Agent, or Firm*—Paul Churilla; Howard A. Skaist

[57] ABSTRACT

An integrated circuit includes: a comparator coupled in a configuration to compare two voltages. One of the two voltages includes a semiconductor junction voltage drop. The other of the two voltages includes a voltage signal, $X V_t$, where $V_t$ is a thermal voltage and X includes a selected signal value, which modulates the thermal voltage. The configuration includes a feedback path to vary X until $X V_t$ approximately equals the voltage including the semiconductor junction voltage drop.

26 Claims, 3 Drawing Sheets

OTHER PUBLICATIONS

Chin, Shu–Yuan and Chung–Yu Wu, A New Type of Curvature–Compensated CMOS Bandgap Voltage References, *VLSITSA*, 1991, pp. 398–402.

Ferro, Marco, Franco Salerno and Rinaldo Castello, "A Floating CMOS Bandgap Voltage Reference for Differential Applications", *IEEE: Journal of Solid–State Circuits*, vol. 24, No. 3, Jun. 1989, pp. 690–697.

Gray, Paul R. and Robert G. Meyer, *Analysis and Design of Analog Integrated Circuits*, published by John Wiely & Sons, 1984, pp. 709–718 and 730–737.

Salminen, O. and K. Halonen, The Higher Order Temperature Compensation of Bandgap Voltage References, 1992 IEEE, pp. 1388–1391.

U.S. Patent Application No. 08/636,024 filed Apr. 19, 1996; which is a continuation of application No. 08/401,473 filed Mar. 9, 1995 (now abandoned); which is a divisional of application No. 08/124,980 filed Sep. 21, 1993 (now abandoned).

| ADDRESS | TEMP (°C) | $V_{be}$ (v) | $V_{ref}$ (v) | $R_x$ (Kohms) |
|---|---|---|---|---|
| 0000 | 20-26 | 0.8413 | 0.11 | 22.95 |
| 0001 | 27-33 | 0.8287 | 0.1126 | 22.08 |
| 0010 | 34-40 | 0.8159 | 0.1152 | 21.25 |
| 0011 | 41-47 | 0.803 | 0.1178 | 20.45 |
| 0100 | 48-54 | 0.7902 | 0.1204 | 19.69 |
| 0101 | 55-61 | 0.7773 | 0.1231 | 18.94 |
| 0110 | 62-68 | 0.7643 | 0.1257 | 18.24 |
| 0111 | 69-75 | 0.7513 | 0.1283 | 17.57 |
| 1000 | 76-82 | 0.7383 | 0.131 | 16.91 |
| 1001 | 83-89 | 0.7253 | 0.1336 | 16.29 |
| 1010 | 90-96 | 0.7122 | 0.1363 | 15.68 |
| 1011 | 97-103 | 0.6991 | 0.1389 | 15.1 |
| 1100 | 104-110 | 0.6859 | 0.1415 | 14.54 |
| 1101 | 111-117 | 0.6728 | 0.1441 | 14 |
| 1110 | 118-124 | 0.6596 | 0.1467 | 13.49 |
| 1111 | >125 | 0.6463 | 0.1494 | 12.98 |

FIG. 2

| ADDRESS | TEMP (°C) | ADJUSTMENT (Hex) |
|---|---|---|
| 0000 | 31-37 | F24 |
| 0001 | 38-44 | F2D |
| 0010 | 45-51 | F37 |
| 0011 | 52-59 | F42 |
| 0100 | 60-67 | F4D |
| 0101 | 68-74 | F5A |
| 0110 | 75-81 | F65 |
| 0111 | 82-88 | F72 |
| 1000 | 89-96 | F7E |
| 1001 | 97-103 | F8E |
| 1010 | 104-111 | F9D |
| 1011 | 112-118 | FAF |
| 1100 | 119-125 | FC0 |
| 1101 | 126-133 | FD1 |
| 1110 | 134-140 | F89 |
| 1111 | >141 | FFF |

FIG. 3

TEMPERATURE MEASUREMENT AND COMPENSATION SCHEME

BACKGROUND OF THE INVENTION

1. Field of the Invention

The present invention relates to measuring temperature and, more particularly, to integrated circuit techniques for measuring temperature and adjusting for temperature effects on circuit operation.

2. Background Information

Many chips, such as microprocessor integrated circuit chips, measure the time elapsed based, at least in part, upon an on-chip clock, such as from a crystal. In some situations, it is desirable to have an independent timing reference and, hence, determine whether the on-chip clock frequency, such as for a microprocessor, exceeds a predetermined frequency value.

In one approach to provide an independent timing reference, for example, on-chip analog circuitry may be used to generate a fixed time period based on a current-capacitor charging time. For example, a metal-oxide semiconductor (MOS) transistor may be employed to implement such a current-capacitor, by electrically coupling the drain and source of the MOS transistor to the same voltage. Likewise, a resistor tied to a power supply may charge the capacitor from 0 volts to a reference voltage, for example, and this charging time may be measured. However, since the length of the charging time may vary with temperature, it is desirable to also have a technique to account for the temperature variation during this charging period.

Various approaches to account for the temperature variation have been employed. One approach is to rely primarily on understanding the temperature characteristics of various electronic circuit components on the chip and arrange the analog circuitry such that the temperature characteristics approximately offset or cancel each other. This approach has a number of problems. One problem with this technique is that the temperature profile for each compensating component is different and, therefore, ultimately limits the range over which this compensation approach may be effective, unless complex steps are taken to match the analog temperature characteristics. Another problem with this approach is that it typically results in summing voltages across the compensating components. Unfortunately, this results in undesirably high operating voltage requirements for advanced processes. Finally, the doping densities of the latest processes are such that components with suitable temperature coefficients are not available in standard logic fabrication processes. Thus, additional processing steps would be employed to adjust for this.

Another scheme implemented has been to embed a resistor-capacitor (RC) network with a low temperature coefficient within the package. This scheme, of course, increases packaging complexity and cost, lowers package reliability, and requires a special package design for each device using this scheme. A need, therefore, exists for a technique of providing temperature compensation for a timer circuit that addresses these problems.

SUMMARY OF THE INVENTION

Briefly, in accordance with one embodiment of the invention, an integrated circuit includes: a comparator coupled in a configuration to compare two voltage signals. One of the two voltages includes a semiconductor junction voltage of a semiconductor device. Another of the two voltages includes a voltage signal, $XV_t$, where $V_t$ is the thermal voltage and X includes a selected signal value modulating the thermal voltage. The configuration includes a feedback path to vary X until $XV_t$ approximately equals the semiconductor junction voltage.

Briefly, in accordance with another embodiment of the invention, an integrated circuit includes a timer circuit to produce for a specified charging time a clock pulse to compare with a reference clock pulse count adjusted by a clock pulse timing adjustment. The integrated circuit further includes a circuit configuration to measure temperature and a look-up table storing clock pulse timing adjustments. The look-up table is responsive to an output signal of the circuit configuration to measure temperature.

Briefly, in accordance with yet another embodiment of the invention, a method of testing the frequency of a clock on an integrated circuit includes the following. A clock pulse count is produced for a predetermined electrical charging time. The temperature of the integrated circuit is measured. A reference clock pulse count is adjusted based, at least in part, upon the temperature measured. The clock pulse count produced is compared with the adjusted clock pulse count.

Briefly, in accordance with yet one more embodiment of the invention, an integrated circuit includes a first transistor coupled in a configuration to operate as a voltage-controlled substantially constant current source. The integrated circuit further includes a second transistor coupled to the first transistor, the second transistor biased to provide a cascode bias with respect to the first transistor. The bias on the second transistor is proportional to the control voltage of the first transistor at a voltage level just sufficient to maintain the first transistor in saturation.

BRIEF DESCRIPTION OF THE DRAWINGS

The subject matter regarded as the invention is particularly pointed out and distinctly claimed in the concluding portion of the specification. The invention, however, both as to organization, and method of operation, together with objects, features, and advantages thereof, may best be understood by reference to the following detailed description, when read with the accompanying drawings in which:

FIG. 2 is a table of resistor values used for the embodiment illustrated in FIG. 1; and FIG. 3 is a table of temperature compensation clock pulse timing adjustment values used for the embodiment illustrated in FIG. 1.

DETAILED DESCRIPTION OF THE INVENTION

Figure 1:
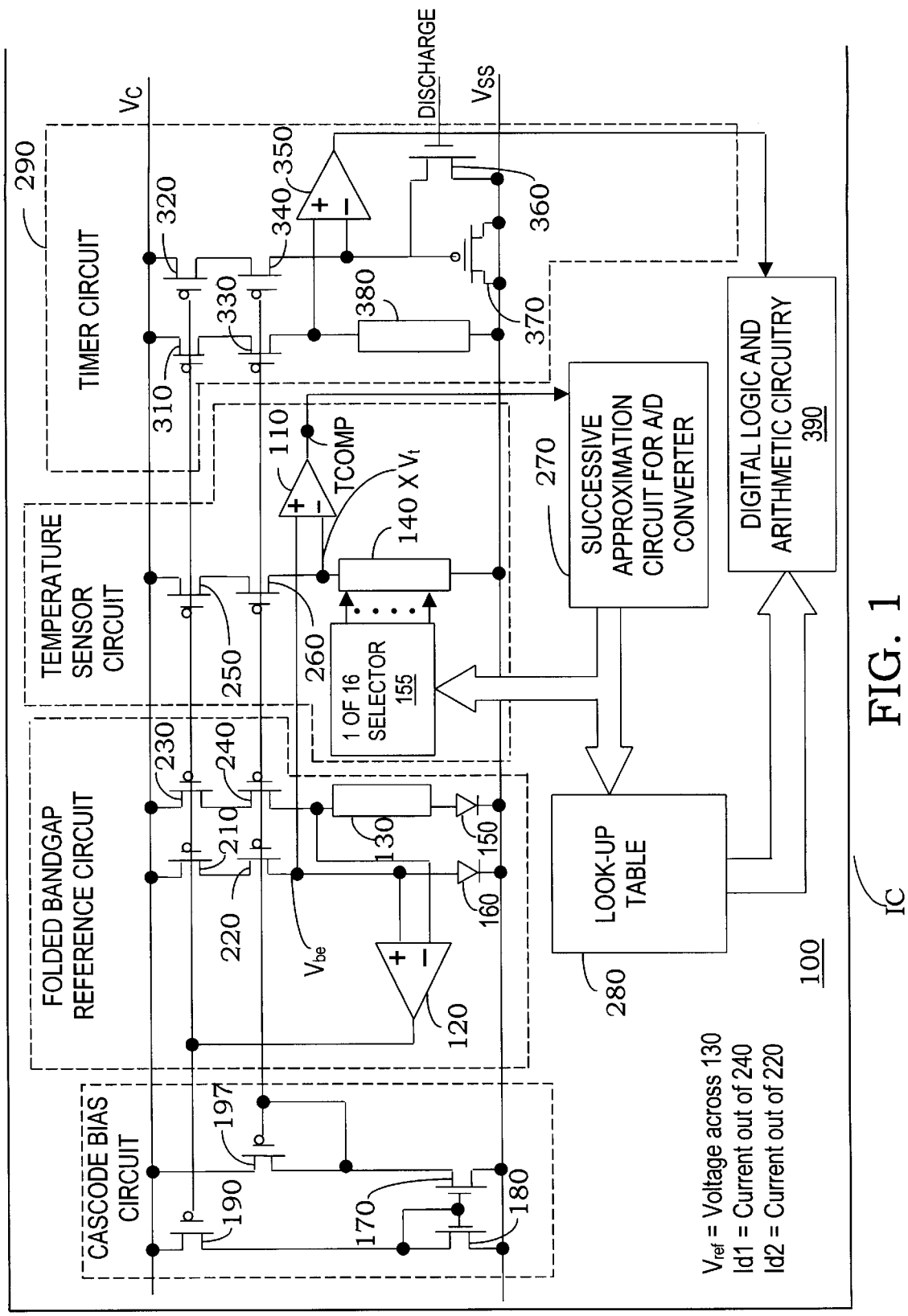
FIG. 1 is a schematic diagram illustrating an embodiment of a timer circuit temperature compensation scheme in accordance with the present invention.

In the following detailed description numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

FIG. 1 is a schematic diagram illustrating an embodiment 100 of a timer circuit temperature compensation scheme in accordance with the invention. Embodiment 100 includes a circuit configuration to measure temperature that may be employed in conjunction with a timer circuit 290 on an integrated circuit, such as a microprocessor. In this particular application, it is desirable to have an independent timing reference other than an on-chip clock. When this independent timing reference is compared against the on-chip clock, it may be determined that the on-chip clock frequency exceeds a predetermined value. One purpose of this independent timing reference is to increase the quality and reliability of an integrated circuit (IC), such as a microprocessor, by detecting remarking of the IC to a higher speed or frequency than originally intended.

The electronic circuitry illustrated in FIG. 1 comprises on-chip circuitry. Timer circuit 290, illustrated in FIG. 1, is employed to generate a relatively fixed time period based on the current-capacitor charge up or charging time, although this time period may vary with temperature as described in more detail hereinafter. In one embodiment, as previously described, this may be achieved by using a current-capacitor, such as a current mirror driving a capacitor, such as 370 in FIG. 1, or resister-capacitor configuration to generate a substantially constant current pulse and measuring the time period for the capacitor to charge from 0 volts to a reference voltage. Digital logic circuitry may measure the pulse length in terms of processor clock cycles, for example, of an analog comparator output signal, such as produced by 350 in FIG. 1, having input signals in which a reference voltage is being compared with the current-capacitor voltage level. This particular embodiment of a timer circuit is described in more detail later.

A programmable fuse array may be employed to generate a clock pulse count corresponding to the time period of the generated pulse, for example, although the invention is not limited in scope in this respect. Programmable fuses have an advantage of reducing processing variations that might affect circuit performance. In this particular embodiment of a timer circuit temperature compensation scheme in accordance with the invention, temperature sensor circuitry communicates with digital logic circuitry to determine what the temperature of the silicon is, such as illustrated in FIG. 1 and described in more detail hereinafter. The circuitry employed to measure the temperature may also partially suppress the effects of power supply noise and operating voltage on the charging time period, although he invention is not restricted in scope in this respect. This may be achieved by using a bandgap circuit and a simple filter, as will be described in more detail. If it is detected that the IC, such as a microprocessor, is being clocked at too high of a frequency rate, e.g., for a predetermined number of successive measurement cycles, a signal may be generated to stop the device. Since the length of the timer circuit charging time varies with temperature, the programmable fuse array, referred to above, stores a fixed reference clock pulse count that is adjusted to account for the temperature variation by an embodiment of a timer circuit temperature compensation scheme in accordance with the invention. This adjusted clock pulse count is compared with the number of clock pulses measured for the pulse length of the analog comparator charging the capacitor to determine whether a predetermined frequency is exceeded. Therefore, this adjusted clock pulse count is compared with a clock pulse count produced by the timer circuit.

In actual operation, in this particular embodiment a circuit configuration to measure temperature includes comparator 110 in conjunction with successive approximation circuitry 270 to obtain a measurement for the temperature and uses the signal produced to read a clock pulse timing adjustment from look-up table 280, where these adjustments are stored. These clock pulse timing adjustments largely compensate for the effect of temperature, as previously described, but may also compensate for other effects, such as those due to processing or the power supply, for example. Nonetheless, we shall refer to these as temperature compensation clock pulse timing adjustments for convenience. This value, which in this particular embodiment is in the form of a negative number, is added to an inverted programmed fuse value for the fixed reference clock pulse count and that sum is used as the maximum clock pulse count for a measurement cycle of the timer circuit. Of course, the invention is not limited in scope to this particular embodiment. For example, the look-up table may store timing adjustment values in a form in which they are a percentage of the reference clock pulse count, for example. A value is produced by digital logic circuitry 390 that measures if the clock pulse count produced by the timer circuit exceeds the maximum clock pulse count. If so, then the microprocessor or other IC part is running at a higher than desirable frequency and a violation count is incremented. In this particular embodiment, eight successive violations will cause a signal that may be used to stop device operation, although the invention is not limited in scope in this respect.

Without temperature compensation, the timer circuit is not precise due to its fully embedded nature. Data indicates that the actual charging time for a current-capacitor timer circuit embodiment such as previously described may vary by plus or minus 16% over the temperature range of 20° C. to 120° C. To help compensate for this error due to temperature, this particular embodiment of a timer circuit temperature compensation scheme in accordance with the invention includes an analog-to-digital (A/D) converter, such as illustrated in FIG. 1, designed so that the digital block may obtain a measurement of the temperature and adjust the expected clock pulse count accordingly. Data indicates that the timer circuit temperature compensation scheme embodiment illustrated in FIG. 1 reduces the errors due to temperature variation down to plus or minus 2%.

As will be discussed in more detail hereinafter, this embodiment of a timer circuit temperature compensation scheme in accordance with the invention determines the temperature of the chip by employing a sequential increase in a temperature range selector via 1-of-16 selector 155, in this embodiment, and reading the feedback signal, Tcomp in FIG. 1, from comparator 110. Successive approximation circuit 270 continues to increment an input signal to 1-of-16 selector 155 until the correct temperature indicated by Tcomp is reached. Once the feedback circuitry determines the correct temperature range, a temperature compensation clock pulse timing adjustment corresponding to the selected temperature range is loaded from look-up table 280, which may be implemented as a read-only-memory, for example, although the invention is not limited in scope in this respect. As described in more detail below, this is accomplished in this embodiment by the input signal to selector 155 also providing a memory address location to look-up table 280. FIG. 3 is a table showing particular temperature compensation clock pulse timing adjustments used in this particular embodiment, however, the invention is not limited in scope to a particular table of values or to a particular implementation of a look-up table. The values for FIG. 3 were calculated from simulation results and a 63 MHz clock frequency.

An embodiment of a timer circuit, such as 290, is illustrated in FIG. 1, although the invention is not limited in scope to this particular embodiment. As illustrated, transistors 310, 320, 330 and 340 operate as current mirrors. Reference resister 380 is chosen to provide a reference voltage to comparator 350. P-MOS (Positive MOS) capacitor 370 is first discharged by driving the gate of transistor 360 high. Once capacitor 370 is discharged and the digital circuitry is ready to start a clock cycle, the gate of transistor 360 is driven low. This signals the beginning of the clock cycle. When capacitor 370 has charged to the reference voltage, the output port of comparator 350 will transition from a low to a high signal, indicating the end of the clock cycle. The number of process clock pulses produced during this cycle may then be employed as previously described. It may be added to a fixed temperature compensation clock pulse timing adjustment read from the look-up table or, alternatively, the temperature compensation clock pulse timing adjustment may comprise a percentage and multiplication may be achieved, for example, by a repetitive shift and add digital technique, although, again, the invention is not limited in scope to this particular embodiment.

As previously indicated, timer circuit 290 implemented as previously described is temperature dependent. Without temperature compensation, a plus or minus 16% variation in the charge up time was observed over a temperature range from 20° C. to 125° C. Therefore, an embodiment of a timer circuit temperature compensation scheme in accordance with the present invention includes a temperature A/D converter using successive approximations, such as illustrated in FIG. 1, to supply a digital signal that may be used to compensate for the temperature dependency of the analog circuitry. The invention, of course, is not restricted to a particular A/D converter circuit or a particular circuit for performing successive approximations. As previously stated, the observed error, due to the temperature dependency, after incorporating temperature compensation, was reduced to plus or minus 2%.

The technique for measuring temperature in this particular embodiment of a timer circuit temperature compensation scheme in accordance with the invention is described below. A diode semiconductor junction voltage, $V_{be}$, is temperature dependent, such as for diode 160, shown in FIG. 1, for example. $V_{be}$ may decrease by about −2 mV for every degree drop in Celsius. In this particular embodiment, the semiconductor junction comprises a P-N junction of the semiconductor device. Of course, other semiconductor devices may be employed. The analog circuit for this configuration is biased using bandgap circuit techniques. This provides several advantages, as will be explained in more detail later. The bias condition varies with the thermal voltage, $V_t$. $V_t$ has a positive thermal coefficient of about +0.087 mV for every degree rise in Celsius. Therefore, for this particular embodiment in accordance with the invention, the temperature measurement circuit shown in FIG. 1 including comparator 110 operates in accordance with the following equation:

$$V_{be}=XV_t \quad [1]$$

The value X comprises a signal value that modulates the thermal voltage, $V_t$, and is also temperature dependent with a unique value at specific distinctly resolvable temperatures. As illustrated in FIG. 1, the comparator is coupled in a configuration to compare the voltage signals $V_{be}$ and $XV_t$. The temperature measurement circuitry uses the feedback successive approximation technique previously described to search for a value of X that will at least approximately satisfy the above equation. This value of X then implicitly provides signal information regarding the circuit temperature measurement.

As illustrated in FIG. 1, in this embodiment, comparator 110 is used for generating the digital temperature signal. The product X times $V_t$ and the diode voltage $V_{be}$ for diode 160 are used as two input signals to comparator 110. $V_{be}$ is used as a positive input signal and X times $V_t$ is used as a negative input signal. In this particular embodiment, when the product X times $V_t$ is equal to or greater than $V_{be}$, the output signal of the comparator will be low. Otherwise, the output signal will be high. Likewise, the product X times $V_t$ is an output signal produced by a resistor network, specifically network 155 shown in FIG. 1 in this particular embodiment. This particular resistor network yields 16 different values for the product X times $V_t$. Each of the 16 different values represents a 7° temperature band in the 20° Celsius to 125° Celsius operating range. It will, of course, be appreciated that alternative embodiments may be employed. As will be described in more detail hereinafter, using a bandgap circuit to generate a bias current through a resistor 130, knowing the voltage across resistor 130, and mirroring the bias current through resistor 130 to a resistor 140, a reference voltage, $XV_t$, is produced that varies predictably with temperature so that the temperature coefficients of the resistors do not hinder the desired measurements. Furthermore, this is accomplished using a bandgap circuit without generating a bandgap voltage, thereby, reducing Vc in this particular embodiment, as is desirable. In this particular embodiment, Vc is below a conventional bandgap voltage. This provides an advantage because lower voltage power supplies may, therefore, be employed and less power is consumed.

Vref is the voltage across resistor 130, Rbgap represents the resistance value, and Id1, is the bias current through the resistor derived from the bandgap circuit. The bias current, Id1, is then mirrored to the rest of the circuit via transistors 210, 230, and 250. Thus, the current employed in the circuit is a multiple of Id1 and derived from the bandgap circuit due to the relative sizing of transistors 250, 230, and 210.

The resistor network in 1-of-16 selector 155, in this embodiment, receives a four-bit input signal, which is then decoded. The select line of the decoder is coupled to the gate of an N-MOS (Negative MOS) pull down device which couples the selected resistor to ground allowing a bias current derived from the bandgap circuit to pass along a selected electrical path coupled to the negative input port of comparator 110, generating a voltage signal to compare against $V_{be}$ at comparator 110. In this particular embodiment, the voltage generated by the resistor network is the bias current Id1 itself multiplied by the value of the selected resistor. This is illustrated by equation [2] below. Vref is proportional to $V_t$, due to the bandgap circuit, as described in more detail hereinafter. Therefore, by appropriately selecting the resistor $R_X$, at a specific temperature the resistor network voltage, X times $V_t$, may be made to approximately equal $V_{be}$. The table of resistor network values is provided in FIG. 2.

$$V_X=Id1 \cdot R_X=\text{Vref} \cdot R_X/R\text{bgap}=V_t \cdot \text{constant} \cdot R_X/R\text{bgap}=X \cdot V_t \quad [2]$$

By increasing the current into the resistor network, the resistor sizes are reduced by the ratio of the current in the resistor network to the current in diode 150. This will reduce the layout area consumed by the network. In a further desire to reduce the network layout area, when implementing the resistor network, resistor values that are common to the network may be factored out to produce a more efficient circuit layout. Data indicates that a four bit resolution is adequate for this particular application. Furthermore, in this embodiment, a five bit resolution would approximately double the resistor network area, but not yield a significant improvement in performance for this particular embodiment. Nonetheless, any one of a variety of resistor network layouts would prove satisfactory.

To operate, successive approximation circuit 270 will present an output signal, such as the address 0000, to the resistor network. The successive approximation circuit provides digital feedback control. The output signal driven by successive approximation circuit 270 represents the current state of the digital control in the form of an address. If the voltage at the output terminal of the resistor network is lower than $V_{be}$, Tcomp, the output signal of the comparator, will be high. Circuit 270 will therefore adjust its output signal by incrementing the address based at least in part upon the output signal of the comparator. Via selector 155, the incremented address will select another electrical path through the resistor network having a different resistance. Again, the successive approximation circuit will sample Tcomp and continue to do so until Tcomp is low. The correct 7° temperature region will have been found when the resistor network output voltage is equal to or just greater than $V_{be}$. Tcomp will then transition from a high to a low logic level. The digital control will then use the 4-bit value representing its current state to look up a temperature compensation clock pulse timing adjustment value in look-up table 280, which in this particular embodiment is a read-only-memory, although the invention is not limited in scope in this respect. This will calibrate the timer circuit to its operating temperature. If address 0000 is selected, 20°–26° centigrade is selected, Tcomp is low, and the circuit temperature is below 20° centigrade. Alternatively, if the address selected is 1111, 125° centigrade is selected, Tcomp is high, and the circuit temperature is greater than 125° centigrade. This will then disable the integrated circuit if it is operating outside the range 20° centigrade to 125° centigrade. This disabling may be accomplished any one of a number of ways. Therefore, this embodiment includes the capability to detect when the circuit is operating outside a desired temperature range.

Although the charge up time for timer circuit 290 may vary due to temperature variations, as previously indicated, feedback using digital control in this embodiment may make an adjustment for temperature so that the nominal charge up time may be appropriately compared. Furthermore, in order to assist in achieving a goal of plus or minus 5% error, the reference voltage and current sources generated exist independent of the power supply. The circuit supply voltage is not used directly because it is, in general, too noisy. Voltage steps may occur due to switching transients inside the IC and clock noise may be present on the supply.

As previously indicated, in this particular embodiment the timing mechanism used is a current-capacitor. A capacitor is charged to a specific reference voltage by a substantially constant current and the time it takes to do so is measured as the charging time. This type of timer circuit is inherently independent of the direct current (DC) supply voltage. Unfortunately, alternating current (AC) supply noise and supply steps occurring during the charge-up time may have a potential impact on the accuracy of the timer circuit. One purpose of a bandgap generated reference voltage is to create a stable voltage supply for the timer circuit and, thus, reduce the effects of the AC noise and voltage steps on the timing accuracy. In summary, a bandgap circuit acts as a low frequency noise filter on the supply.

Three separate ranges of noise frequency are considered: (1) low frequency noise caused by slow sequences or changes in the mode of operation, for example, as a microprocessor might execute code, (2) mid-range frequency noise, for example, that might be caused by program execution and the presence of sub-multiples of a microprocessor clock, and (3) high frequency noise that might be caused by the clock and sub-multiples of the clock. One purpose of the bandgap/operational amplifier circuit, including, for example, op amp 120 shown in FIG. 1, is to provide a stable power supply which isolates the timer circuit from low frequency noise and step voltage variations of the chip power supply. Therefore, the circuit configuration chosen may supply the current desired to the timer circuit. Operational amplifier performance, however, may not reject mid- and high frequency range noise.

Decoupling capacitors (approximately 30 pF in this embodiment) may be placed on nodes in the circuit so as to short the mid- and high-frequency range noise. Good locations for placing decoupling capacitors (not shown) are at the reference voltage node to the comparator between the current sources and supply lines, although the invention is not restricted in scope in this respect. For this particular embodiment, the decoupling capacitors are implemented using MOS technology.

The bandgap based circuit shown in FIG. 1 is not a classical textbook bandgap circuit in that the circuit is not temperature compensated. In fact, the bias current produced by the bandgap circuit varies with temperature. In the circuit shown in FIG. 1, the input voltages to op amp 120 will be approximately equal at a stable operating point. The output signal of op amp 120, in its transconductance configuration, provides the gate voltage for the P-MOS semiconductor devices which serve as substantially constant current sources. The current source through diode 160 and the input leg, Id2, of the op amp is five times that of the input leg, Id1, as a result of current mirroring, although the invention is, of course, not limited to a multiple of five as to any particular multiple. The diode semiconductor function voltage $V_{be}$ is described by the following equation:

$$V_{be}=V_t \cdot L_n([Id/(AI_s)]) \qquad [3]$$

The voltage $V_t$ is called the thermal voltage and is described by the equation $V_t$ equals K times T/q where K is Boltzmann's constant, T is the absolute temperature in Kelvin and q is the magnitude of the electronic charge. As previously indicated, $V_t$ increases by about 0.087 millivolts per degree change in Celsius. $V_t$ is equal to approximately 26 millivolts at room temperature. $L_n$ represents the natural logarithm. Id/A represents the current density of the diode. $I_s$ is a constant referred to as the saturation current. $I_s$ is on the order of 10e–15. The voltage $V_{ref}$ may be calculated using the voltage loop from the op amp negative input port through ground and up to the positive op amp input port. The sum of the voltages in this loop is approximately equal to zero. Solving the equation for $V_{ref}$, the voltage across the bandgap resistor, will yield $$V_{ref}=V_t \cdot L_n(Id2 \cdot A1/Id \cdot A2)=Id1 \cdot Rbgap \quad Id1=V_{ref}/Rbgap \qquad [4]$$

As equation [4] illustrates, $V_{ref}$ is a constant that varies with the thermal voltage. The current Id1 is determined, at least in part, by the value of the bandgap resistance, Rbgap, of resistor 130. This bias condition is mirrored into the rest of the circuit. Thus, the bias current for the analog circuitry is power supply independent, as noted by the equation for $V_{ref}$. Furthermore, a bandgap bias current has been created without producing a bandgap voltage, which is desirable since it permits a lower Vc. As previously discussed, this provides an advantage in terms at power consumption. As mentioned before, the circuit is still temperature dependent due to $V_t$, however.

An embodiment of a timer circuit temperature compensation scheme in accordance with the present invention provides a number of advantages. First, by removing the need to sum the voltage drops across two or more temperature sensitive elements, an operating voltage of just greater than a diode voltage, such as 0.7 volts may be attained. This is substantially less than even a conventional bandgap voltage. Furthermore, circuit elements for standard temperature compensation techniques are not employed. Therefore, it is not necessary for circuit elements to have matching temperature coefficients, for example, one with a "medium" positive temperature coefficient, one with a "high" negative coefficient, and one with "low" negative coefficient. Finally, an embodiment in accordance with the invention by providing a temperature compensation or adjustment look-up table may match any arbitrary circuit temperature profile over a wide range of temperatures. Even the temperature measurement circuit does not need to be linear, if it has a predictable profile to permit temperature adjustment factors to be generated for the look-up table. In contrast, standard process circuit elements have different temperature profiles. When they are combined to provide temperature compensation, the compensation occurs only over a small range for which the temperature coefficients match. Thus, an embodiment in accordance with the invention reduces these problems.

An embodiment of a method of testing the frequency of a clock on an integrated circuit may be accomplished in accordance with the following. A reference clock pulse count may be produced for a predetermined electrical charging time, such as previously described. This clock pulse count may be stored in a programmable fuse array, for example, although the invention is not limited in scope in this respect. Likewise, during IC operation, for example, a clock pulse count may be produced, such as previously described with respect to timer circuit 290. For example, a clock pulse count may be produced for the amount of time it takes a capacitor to charge from 0 volts to a reference voltage with a substantially constant current.

Likewise, the temperature of the integrated circuit may be measured, such as previously described in connection with embodiment 100 of FIG. 1. For example, two voltages having known temperature profiles, such as the semiconductor junction voltage of a semiconductor device and a voltage proportional to the thermal voltage, $V_t$, may be approximately equalized by a unique value of a circuit component parameter at specific distinctly resolvable temperatures of the integrated circuit. This is illustrated, for example, by equation [1] and the embodiment shown in FIG. 1. A circuit parameter relating the two voltages may be adjusted until the two voltages are substantially equal. For example, for the embodiment shown in FIG. 1, via selector 155, resistor values are adjusted as previously described. Once the voltages are approximately equalized, the resistor value that approximately equalizes them effectively provides a measurement of the temperature in this particular embodiment.

Likewise, the reference clock pulse count produced for the predetermined electrical charging time may be adjusted based, at least in part, upon this measurement. For example, as previously described, look-up table 280 contains temperature compensation clock pulse adjustments corresponding to the resistor values in selector 155. Thus, the reference clock pulse count may be added to the temperature compensation clock pulse adjustment corresponding to the resistance that substantially equalizes the two voltages. Alternatively, as previously discussed, the temperature compensation clock pulse adjustment may be stored in an alternative form, such as a percentage of the reference clock pulse count, for example. As previously described with respect to the embodiment shown in FIG. 1, the adjusted clock pulse count may then be compared with the clock pulse count produced for a predetermined electrical charging time.

Yet another aspect of this embodiment relates to a transistor self-biasing technique employed to reduce Vc. This aspect of the embodiment is applicable in many other areas beyond and unrelated to the embodiment previously described. As illustrated in FIG. 1, the output signal of op amp 120, in its transconductance configuration, provides the gate voltage for the P-MOS transistors, such as 210, 230 and 250, which are coupled in a configuration to operate as voltage-controlled substantially constant current sources. The gate voltages are the control voltages. Likewise, transistors 220, 240, and 260 are respectively coupled to transistors 210, 230, and 250 to provide a cascode bias with respect to transistors 210, 230 and 250. Cascoding is a common technique used to improve the accuracy of current mirror circuits.

However, typically the cascode bias voltage, for example, applied to the gates of transistors 220, 240, and 260, is generated directly, such as with a potential divider. Due to voltage variations from, for example, process variations, temperature variations, or the power supply, typically the cascode transistors, such as 220, 240 and 260, are biased so that even with these voltage variations, the cascode transistors provide a voltage at the drain of the transistors operating as voltage-controlled substantially constant current sources, such as 210, 230, and 250, so that these transistors maintain operation in saturation. A disadvantage of this approach is that it requires a larger Vc providing sufficient margin for this potential variation in operating conditions.

Yet another approach is to bias the cascode transistors using a divider based, at least in part, on an active device, such as another P-MOS transistor, for transistors 220, 240, and 260. However, even this technique provides relatively poor tracking and utilizes a Vc having sufficient margin for the varying operating conditions.

In contrast, the embodiment illustrated in FIG. 1 uses a self-tracking or self-biasing technique to adjust for voltage variations, from such as, for example, process or temperature changes, to maintain a cascode bias approach with very little additional supply voltage over a circuit not employing a cascode bias approach. For the embodiment illustrated in FIG. 1, Vc is small and little margin is available for the cascode bias. To track, for example, process, temperature, and power supply variations, the bias on transistors 220, 240, and 260 is proportional to the control voltages applied to transistors 210, 230, and 250. For this particular embodiment, as previously described, the control voltage, such as for transistor 210 as an example, is driven by the output signal of op amp 120. Therefore, the control voltage for transistor 210 is coupled in a feedback loop of a bandgap circuit so that the current produced comprises a bandgap circuit bias current.

The bias applied to the gate of the cascode bias transistors, such as transistor 220, for example, is produced using transistors coupled in a configuration to operate as current mirrors. Specifically, in FIG. 1, this includes transistors 190, 180, 170, and 197. Furthermore, these transistors are relatively sized so that the control voltage level applied to the gates of the cascode transistors results in a voltage at the drains of the transistors operating as voltage-controlled current sources just sufficient to keep or maintain these transistors, such as 210, 230, and 250, operating in saturation. Therefore, in comparison with the previously described approaches, this approach results in a bias that tracks variations, such as those due to temperature, process, or the power supply. In this embodiment, assuming transistors 180 and 170 are approximately the same size, the size of transistor 190 may be ratioed to the size of transistor 197 to produce this result.

In this particular embodiment, due to the bandgap circuit configuration, an additional pole is introduced in the feedback loop. Therefore, conventional stabilization techniques may be employed to ensure that the overall gain of the circuit is such that the cascode bias is stable. Likewise, although this self-biasing technique is employed using MOS transistors, the invention is not limited in scope to MOS transistors. For example, bipolar transistors or both MOS and bipolar transistors may be employed. It is also appreciated that the term MOS includes transistors in which metal is substituted with another conductor or conducting material, such as, for example, polysilicon.

While certain features of the invention have been illustrated and described herein, many modifications, substitutions, changes and equivalents will now occur to those skilled in the art. For example, other applications may employ more or less temperature resolution. Furthermore, alternative temperature measuring schemes may be employed. Likewise, a timer circuit temperature compensation scheme in accordance with the invention may be employed in conjunction with a coarse, analog temperature coefficient matching technique to reduce the range for the temperature compensation scheme. It is, therefore, to be understood that the appended claims are intended to cover all such modifications and changes as fall within the true spirit of the invention.

What is claimed is:

1. An integrated circuit comprising:
   a comparator being coupled in a configuration to compare two voltage signals, one of the two voltage signals comprising a semiconductor junction voltage of a semiconductor device, another of the two voltage signals comprising a voltage signal X $V_t$, where $V_t$ comprises the thermal voltage and X comprises a selected signal value modulating the thermal voltage;
   the comparator configuration including a feedback path to vary X until X $V_t$ approximately equals the semiconductor junction voltage.

2. The integrated circuit of claim 1, wherein the comparator configuration includes an electrical path to produce the voltage signal $XV_t$ at least in part from a bias current supplied along said electrical path, the bias current being derived from a bandgap circuit.

3. The integrated circuit of claim 2, wherein said bandgap circuit comprises a bandgap circuit to produce said bias current without generating a bandgap voltage.

4. The integrated circuit of claim 3, wherein said electrical path comprises a selected electrical path through a resistor network.

5. The integrated circuit of claim 4, wherein said feedback path to vary X comprising a successive approximation circuit to sample an output signal of said comparator and produce the output signal of said successive approximation circuit, based at least in part, upon the output signal of said comparator, wherein said selected electrical path through a resistor network is based, at least in part, upon the output signal of said successive approximation circuit.

6. The integrated circuit of claim 5, and further comprising a look-up table responsive to the output signal of said successive approximation circuit, said look-up table storing clock pulse timing adjustments.

7. The integrated circuit of claim 1, wherein the semiconductor junction voltage comprises a P-N junction voltage of the semiconductor device.

8. An integrated circuit circuit comprising:
   a timer circuit to produce for a specified charging time a clock pulse count to compare with a reference clock pulse count adjusted by a temperature compensation clock pulse timing adjustment;
   a circuit configuration to measure temperature; and
   a look-up table storing clock pulse timing adjustments, said look-up table responsive to an output signal of said circuit configuration to measure temperature.

9. The integrated circuit of claim 8, wherein said specified charging time comprises the elapsed time to charge a capacitor with an approximately constant current from a first predetermined reference voltage to a second predetermined reference voltage.

10. The integrated circuit of claim 8, wherein said circuit configuration to measure temperature includes a bandgap circuit to produce a bias current proportional to the thermal voltage, $V_t$.

11. The integrated circuit of claim 10, wherein said circuit configuration to measure temperature has an operating voltage below a bandgap voltage.

12. The integrated circuit of claim 10, wherein said bandgap circuit to produce a bias current does not produce a bandgap voltage.

13. The integrated circuit of claim 8, wherein the output signal of said current configuration to measure temperature comprises a memory address location and said look-up table comprises a read-only-memory (ROM).

14. The integrated circuit of claim 8, wherein said look-up table stores temperature compensation clock pulse timing adjustments in the form of a percentage of the reference clock pulse count.

15. The integrated circuit of claim 8, wherein said look-up table stores temperature compensation clock pulse timing adjustments in the form of signal values to be added to the reference clock pulse count.

16. A method of testing the frequency of a clock on an integrated circuit comprising:
   producing a clock pulse count for a predetermined electrical charging time;
   measuring the temperature of the integrated circuit;
   adjusting a reference clock pulse count based, at least in part, upon the temperature measured; and
   comparing the clock pulse count produced for the predetermined electrical charging time with the reference clock pulse count adjusted for the measured temperature.

17. The method of claim 16, wherein producing a clock pulse count for a predetermined electrical charging time comprises producing a clock pulse count for the time it takes a capacitor to charge from a first reference voltage to a second reference voltage.

18. The method of claim 16, wherein measuring the temperature of the integrated circuit comprises:
   comparing two voltages having known temperature profiles, the two voltages capable of being approximately equalized by a unique value of a circuit component parameter at a distinctly resolvable temperature of the integrated circuit; and
   changing the circuit component parameter relating the two voltages until the two voltages are approximately equal.

19. The method of claim 18, wherein one of the two voltages comprises the semiconductor junction voltage of a semiconductor device, and another of the two voltages comprises a voltage proportional to the thermal voltage, $V_t$.

20. The method of claim 19, wherein changing the circuit component parameter relating the two voltages until the two voltages are approximately equal comprises changing a resistance.

21. The method of claim 20, wherein the step of adjusting the reference clock pulse count comprises adding a clock pulse adjustment corresponding to the resistance that approximately equalizes the two voltages.

22. The method of claim 20, wherein the step at adjusting the reference clock pulse count includes using a clock pulse adjustment that comprises a percentage of the reference clock pulse count.

23. An integrated circuit comprising:
   a first transistor coupled in a configuration to operate as a voltage-controlled substantially constant current source;
   a second transistor coupled to the first transistor, said second transistor biased to provide a cascode bias with respect to said first transistor;
   the bias on said second transistor being proportional to the control voltage of said first transistor at a voltage level just sufficient to maintain said first transistor in saturation.

24. The integrated circuit of claim 23, wherein said transistors comprise metal-oxide semiconductor (MOS) transistors.

25. The integrated circuit of claim 23, wherein said first transistor is coupled in a bandgap circuit, the control voltage being coupled in a feedback loop of said bandgap circuit so that the substantially constant current comprises a bandgap circuit bias current.

26. The integrated circuit of claim 25, wherein the bias on said second transistor proportional to the control voltage of said first transistor is produced using a plurality of transistors coupled in a configuration to operate as current mirrors and relatively sized to provide a control voltage level just sufficient to maintain said first transistor in saturation.

* * * * *